(12) United States Patent
Tanaka et al.

(10) Patent No.: US 12,117,664 B2
(45) Date of Patent: Oct. 15, 2024

(54) OPTICAL LENS, CAMERA MODULE AND ASSEMBLING METHOD

(71) Applicant: NINGBO SUNNY OPOTECH CO., LTD., Yuyao (CN)

(72) Inventors: Takehiko Tanaka, Yuyao (CN); Liefeng Chen, Yuyao (CN); Lin Liu, Yuyao (CN); Chunmei Liu, Yuyao (CN)

(73) Assignee: NINGBO SUNNY OPOTECH CO., LTD., Yuyao (CN)

( * ) Notice: Subject to any disclaimer, the term of this patent is extended or adjusted under 35 U.S.C. 154(b) by 757 days.

(21) Appl. No.: 17/270,213

(22) PCT Filed: Jul. 17, 2019

(86) PCT No.: PCT/CN2019/096344
§ 371 (c)(1),
(2) Date: Feb. 22, 2021

(87) PCT Pub. No.: WO2020/042802
PCT Pub. Date: Mar. 5, 2020

(65) Prior Publication Data
US 2021/0333503 A1      Oct. 28, 2021

(30) Foreign Application Priority Data

Aug. 30, 2018 (CN) .......................... 201811003070.7
Aug. 30, 2018 (CN) .......................... 201821412342.4

(51) Int. Cl.
*G02B 7/02*       (2021.01)
(52) U.S. Cl.
CPC ............. *G02B 7/025* (2013.01); *G02B 7/021* (2013.01)

(58) Field of Classification Search
CPC ........ G02B 7/025; G02B 7/021; G02B 7/003; G02B 7/023; G02B 7/02; H04N 23/55; G03B 17/12; G03B 30/00
(Continued)

(56) References Cited

U.S. PATENT DOCUMENTS 8,208,210 B2    6/2012   An et al.
8,587,882 B2   11/2013   Wippermann et al.
(Continued)

FOREIGN PATENT DOCUMENTS

CN     102662222 B    4/2014
CN     207067513 U    3/2018
(Continued)

OTHER PUBLICATIONS

English translation of KR-20140076761 (year: 2014) (Year: 2014).*
International Search Report (PCT/ISA/210) issued in PCT/CN2019/096344, dated Oct. 23, 2019.

*Primary Examiner* — Jie Lei
*Assistant Examiner* — Kuei-Jen L Edenfield
(74) *Attorney, Agent, or Firm* — Birch, Stewart, Kolasch Birch, LLP

(57) ABSTRACT

The present application provides an optical lens, comprising: a first lens component, a second lens component and a first glue material. A first lens sheet group of the first lens component and a second lens sheet group of the second lens component together constitutes an imageable optical system, wherein a second lens barrel of the second lens component has an outer top surface and an inner top surface, and the second lens sheet group bears against the inner top surface. The outer top surface comprises a glue spreading surface suitable for arranging the first glue material and an extension surface formed by extending from the glue spreading surface to a central axis of the second lens barrel, there is a first thickness from the glue spreading surface to the inner top
(Continued)

surface, there is a second thickness from the extension surface to the inner top surface, and the first thickness is greater than the second thickness. The present application further provides a corresponding camera module and an assembling method. The present application can improve the mechanical strength and reliability of the black object of the second lens component, can improve the yield of the optical lens or the camera module, and contributes to the miniaturization of the camera module.

19 Claims, 2 Drawing Sheets

(58) Field of Classification Search
USPC .................................................. 359/819–827
See application file for complete search history.

(56) References Cited

U.S. PATENT DOCUMENTS

| 2008/0252771 A1 | 10/2008 | Wu |
| 2012/0200946 A1 | 8/2012 | Wippermann et al. |

FOREIGN PATENT DOCUMENTS

| CN | 207249220 U | | 4/2018 | |
| CN | 207336902 U | | 5/2018 | |
| CN | 108121043 A | | 6/2018 | |
| EP | 3 355 113 A2 | | 8/2018 | |
| JP | 2002-303773 A | | 10/2002 | |
| JP | 2007-101737 A | | 4/2007 | |
| JP | 2010-191345 A | | 9/2010 | |
| KR | 10-2014-0076761 A | | 6/2014 | |
| KR | 20140076761 A | * | 6/2014 | ............ G02B 7/021 |
| TW | I571667 B | | 2/2017 | |

* cited by examiner

OPTICAL LENS, CAMERA MODULE AND ASSEMBLING METHOD

CROSS-REFERENCE TO RELATED APPLICATIONS

The present application claims the priority and benefit of Chinese invention patent application No. 201811003070.7, entitled "Optical lens, Camera module and Assembling method", filed with the China National Intellectual Property Administration (CNIPA) on Aug. 30, 2018, and Chinese utility model patent application No. 201821412342.4, entitled "Optical lens and to Camera module", filed with the CNIPA on Aug. 30, 2018, which are incorporated herein by reference.

TECHNICAL FIELD

The present application relates to the technical field of optical imaging. Specifically, the present application relates to an optical lens, a camera module and an assembling method.

TECHNICAL BACKGROUND

With the development of mobile phones, computers and other terminals, users have improved a lot for various needs. Especially with the development of mobile phones, the users' pursuit of photographing quality has led manufacturers to develop personalized and customized camera modules such as those with a large aperture and a large wide angle, and lenses with a large number of lens sheets that solve aberrations. On the one hand, this is more and more complicated in optical design. On the other hand, the reality is that the complex optical system is very sensitive, which poses no small challenge to the manufacturing yield and product quality. Because the optical system of the camera module with the large aperture and the large wide-angle is more sensitive, the reliability of its manufacturing process and verification process will be more fragile than conventional designs. Therefore, a lens with a better structure is now needed.

On the other hand, in order to meet the increasingly widespread market demands, high pixels, small size and large aperture are irreversible development trends of the existing camera modules. However, it is very difficult to achieve the three requirements of high pixels, small size and large aperture in the same camera module. For example, the compact development of mobile phones and the increase in screen-to-body ratio of mobile phones have made the space available for front camera modules in the mobile phones smaller and smaller, and the market has put forward higher and higher demands for the to imaging quality of camera modules.

In the field of compact camera modules (e.g. camera modules used in mobile phones), it is often necessary to consider the quality of optical imaging lenses and manufacturing errors in the module assembling process. Specifically, in the production process of the optical imaging lens, the factors affecting the resolution of the lens come from errors of each element and its assembly, an error of the thickness of a lens sheet spacer element, an error of the assembly fit of each lens sheet, a change of a refractive index of a lens sheet material and so on. Because there are many factors affecting the resolution of the lens, which exist in a plurality of elements, the control of each factor has the limit of production accuracy. If only the accuracy of each element is improved, the improvement ability is limited and the improvement cost is high. Furthermore, it cannot meet the market's increasing demands for the image quality.

The application proposed an assembling method in which a relative position of upper and lower sub-lenses is adjusted and determined based on an Active Alignment process, and then the upper and lower sub-lenses are bonded together according to the determined relative position, thereby producing a complete optical lens or camera module. This solution can improve the process capability index (CPK) of mass-produced optical lenses or camera modules; can loosen the requirements for the accuracy of each element of the materials (such as sub-lenses or photosensitive assemblies used to assemble the optical lens or camera module) and their assembly accuracy, thereby reducing the overall cost of optical imaging lenses and camera modules; and can adjust various aberrations of the camera modules in real time during the assembly process, reduce the defect rate, reduce the production costs, and improve the image quality.

However, actively calibrating the optical system of the camera lens itself is a new production process. Actual mass production needs to consider many factors such as reliability, drop resistance, weather resistance and manufacturing cost of the optical lens and camera module, and sometimes it is also necessary to face the decrease in the yield due to various unpredictable factors. Improving the structural reliability of the optical lenses manufactured based on the Active Alignment process is an important consideration for improving the imaging quality and yield of such optical lenses. Therefore, there is an urgent need for a solution that can improve the structural reliability of the optical lenses manufactured based on the Active Alignment process.

SUMMARY

The present application is intended to provide a solution that can overcome at least one shortcoming of the prior art.

According to an aspect of the present application, there is provided an optical lens, comprising: a first lens component comprising a first lens sheet group, the first lens sheet group comprising at least one first lens sheet; a second lens component comprising a second lens barrel and a second lens sheet group mounted in the second lens barrel, the second lens sheet group comprising at least one second lens sheet, the first lens sheet group and the second lens sheet group together constituting an imageable optical system, wherein the second lens barrel has an outer top surface and an inner top surface, and the second lens sheet group bears against the inner top surface; and a first glue material arranged between the outer top surface and a bottom surface of the first lens component, the first glue material being suitable for supporting and fixing the first lens component and the second lens component after curing, so that a relative position of the first lens component and the second lens component is maintained at a relative position determined by Active Alignment, The outer top surface comprises a glue spreading surface suitable for arranging the first glue material and an extension surface formed by extending from the glue spreading surface to a central axis of the second lens barrel, there is a first thickness from the glue spreading surface to the inner top surface, there is a second thickness from the extension surface to the inner top surface, and the first thickness is greater than the second thickness.

In some embodiments, the first glue material is not arranged on the extension surface.

In some embodiments, there is a transition surface between the glue spreading surface and the extension surface.

In some embodiments, the transition surface is an inclined surface, and an included angle between the transition surface and the central axis of the second lens barrel is 30° to 85°.

In some embodiments, the glue spreading surface is a flat surface.

In some embodiments, the inner top surface comprises a bearing surface that bears against the second lens sheet group and a non-bearing surface that does not bear against the second lens sheet group, the bearing surface has a first end close to the central axis and a second end facing away from the central axis, and in a radial direction, one end of the transition surface connected to the extension surface is located at a position between the first end and the second end, wherein the radial direction is a direction perpendicular to the central axis.

In some embodiments, there is a midpoint between the first end and the second end; and in the radial direction, the one end of the transition surface connected to the extension surface is located at the midpoint or at a position closer to the central axis than the midpoint.

In some embodiments, in an axial direction, a distance from the glue spreading surface to the extension surface is at least 50 microns, and the axial direction is a direction parallel to the central axis.

In some embodiments, the first lens component further comprises a first lens barrel, and the first lens sheet group is mounted in the first lens barrel.

In some embodiments, the first lens sheet group comprises an optical zone and a structural zone surrounding the optical zone, and a bottom surface of the structural zone has a retracted surface that avoids the glue spreading surface.

In some embodiments, the retracted surface comprises an inclined surface corresponding to the transition surface.

In some embodiments, a distance between the extension surface and a bottom surface of the first lens sheet group is 30 to 150 microns.

In some embodiments, a distance between the transition surface of the second lens barrel and the inclined surface of the first lens sheet group is at least twice a distance between the extension surface and a bottom surface of the first lens sheet group.

In some embodiments, there is a first design distance and a second design distance between the first lens component and the second lens component; the first design distance is at least twice the second design distance; the first design distance is a design distance between the transition surface of the second lens barrel and the inclined surface of the first lens sheet group that is determined by an optical design of the optical system; and the second design distance is a design distance between the extension surface and a bottom surface of the first lens sheet group that is determined by the optical design of the optical system.

In some embodiments, there is a non-zero included angle between an optical axis of the first lens component and an optical axis of the second lens component.

In some embodiments, an inner side surface of the second lens barrel has multiple steps, and the at least one second lens sheet is sequentially to embedded in the multiple steps to assemble the second lens sheet group.

The present application further provides a camera module, comprising any one of the foregoing optical lenses.

The present application further provides an optical lens assembling method, comprising: pre-positioning a first lens component and a second lens component so that a first lens sheet group comprised in the first lens component and a second lens sheet group comprised in the second lens component together constitute an imageable optical system, wherein the first lens sheet group comprises at least one first lens sheet, the second lens component further comprises a second lens barrel, the second lens sheet group is mounted in the second lens barrel, the second lens sheet group comprises at least one second lens sheet, the second lens barrel has an outer top surface and an inner top surface, the second lens sheet group bears against the inner top surface, the outer top surface comprises a glue spreading surface and an extension surface formed by extending from the glue spreading surface to a central axis of the second lens barrel, there is a first thickness from the glue spreading surface to the inner top surface, there is a second thickness from the extension surface to the inner top surface, and the first thickness is greater than the second thickness; actively calibrating a relative position of the first lens component and the second lens component based on an imaging result of the optical system; and bonding the first lens component and the second lens component, so that the relative position of the first lens component and the second lens component is maintained at a relative position determined by Active Alignment.

In some embodiments, an inner side surface of the second lens barrel has multiple steps, and the optical lens assembling method further comprises: inverting the second lens barrel, and then sequentially embedding the at least one second lens sheet into the multiple steps to assemble the second lens sheet group.

In some embodiments, the pre-positioning further comprises: obtaining positions of the first lens component and the second lens component by laser ranging, and then performing the pre-positioning, wherein the position of the second lens component is obtained by performing laser ranging on the outer top surface.

In some embodiments, the bonding comprises: arranging a first glue material on the glue spreading surface; and curing the first glue material so that the relative position of the first lens component and the second lens component is maintained at the relative position determined by the Active Alignment.

In some embodiments, the curing the first glue material comprises: pre-curing the first glue material by exposure; and permanently curing the first glue material by baking.

In some embodiments, the arranging the first glue material is performed before the Active Alignment or after the Active Alignment is completed.

Compared with the prior art, the present application has at least one of the following technical effects:

1. The present application can improve the mechanical strength and reliability of the black object (i.e. the second lens barrel) of the second lens component.

2. The present application can improve the flatness of the glue dispensing region after the second lens component is assembled, thereby improving the yield of the optical lens or camera module.

3. The present application can avoid increasing the total optical length (TTL) of the camera module and contributes to the miniaturization of the camera module.

4. The present application can avoid increasing the height of the optical lens (i.e. the size in the optical axis direction), and contributes to the miniaturization of the camera module.

5. The present application can avoid or suppress the curvature of the skyward surface of the second lens barrel caused by assembling the second lens sheet group, thereby avoiding or suppressing product defects or image quality degradation caused by inaccurate prepositioning of the second lens component.

6. The present application can avoid or suppress the curvature of the skyward surface of the second lens barrel caused by assembling the second lens sheet group, thereby avoiding or suppressing the excessive time consumption of the Active Alignment process caused by the inaccurate pre-positioning of the second lens component, and therefore the present application can improve the production efficiency.

7. The present application can better resist the variations of the imaging quality of the optical lens caused by environmental factors during production or during long-term use such as baking, exposure and humidity through thickening the top of the second lens barrel.

BRIEF DESCRIPTION OF THE DRAWINGS

The exemplary embodiments are shown in the reference drawings. The embodiments and drawings disclosed herein are to be considered illustrative and not restrictive.

DETAILED DESCRIPTION OF THE EMBODIMENTS

Figure 1:
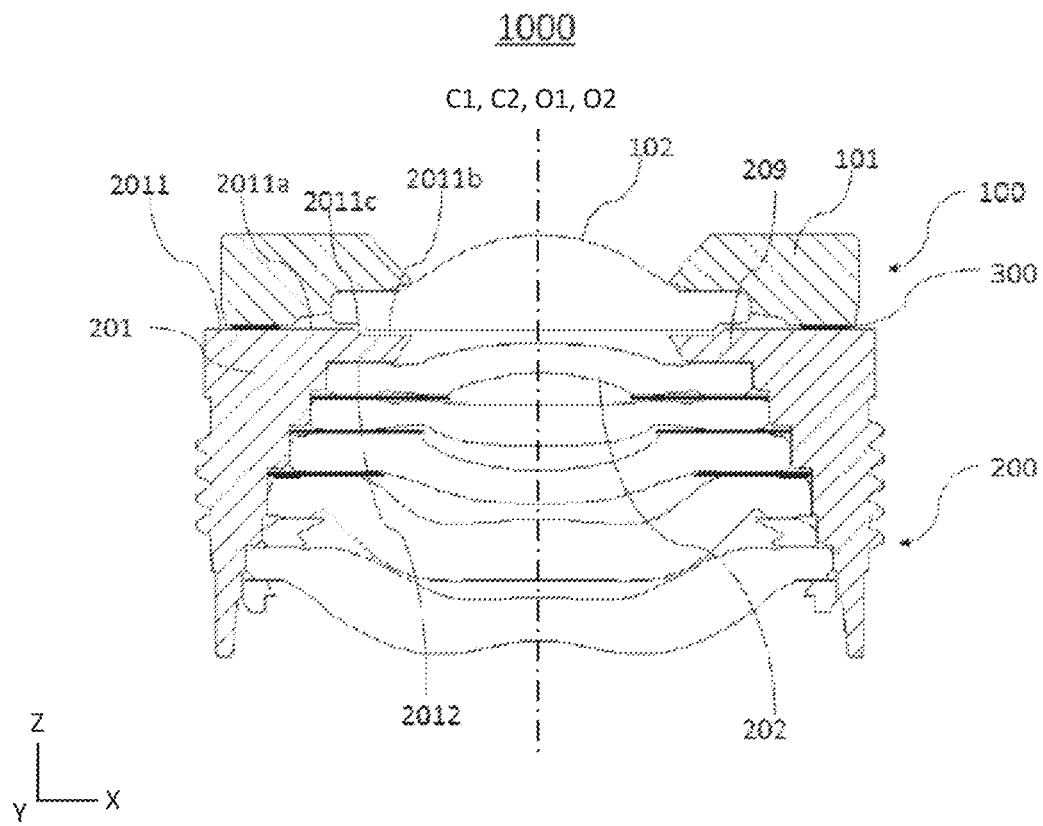
FIG. 1 shows a schematic cross-sectional view of an optical lens 1000 according to an embodiment of the present application.

In order to better understand the present application, various aspects of the present application will be described in more detail with reference to the drawings. It should be understood that the detailed description is merely description of exemplary embodiments of the present application, and does not limit the scope of the present application in any way. Throughout the description, the same reference numerals refer to the same elements. The expression "and/or" includes any and all combinations of one or more of the associated listed items.

It should be noted that in the present description, the expressions of "first", "second", etc. are only used to distinguish one feature from another feature, and do not indicate any limitation on the feature. Therefore, without departing from the teachings of the present application, a first lens sheet discussed below may also be referred to as a second lens sheet.

In the drawings, for convenience of explanation, the thickness, size, and shape of the object have been slightly exaggerated. The drawings are only examples and are not drawn strictly to scale.

It should also be understood that the terms "comprising", "comprise", "having", "including" and/or "include" when used in the present description, indicate the existence of stated features, integers, steps, operations, elements and/or components, but does not exclude the presence or addition of one or more other features, integers, steps, operations, elements, components and/or combinations thereof. Furthermore, when an expression such as "at least one of" appears after the list of listed features, it modifies the entire list of listed features, rather than the individual elements in the list. In addition, when describing the implementations of the present application, the use of "may" means "one or more implementations of the present application", and, the term "exemplary" refers to an example or illustration.

As used herein, the terms "substantially", "approximately" and similar terms are used as a term expressing an approximation and not as a term expressing an extent, and are intended to indicate an inherent deviation in a measurement value or calculated value, which will be recognized by those of ordinary skill in the art.

Unless otherwise defined, all terms (including technical and scientific terms) used herein have the same meanings as commonly understood by those of ordinary skill in the art to which the present application belongs. It should also be understood that the terms (such as those defined in commonly used dictionaries) should be interpreted to have meanings consistent with their meaning in the context of the relevant art and will not be interpreted in an idealized or overly formal sense unless it is clearly defined herein.

It needs to be explained that, in the case of no conflict, the embodiments in the present application and the features in the embodiments can be combined with each other. The present application will be described in detail below in conjunction with embodiments with reference to the drawings.

FIG. 1 shows a schematic cross-sectional view of an optical lens 1000 according to an embodiment of the present application. As shown in FIG. 1, the optical lens 1000 of this embodiment includes a first lens component 100, a second lens component 200 and a first glue material 300. The first lens component 100 includes a first lens sheet group, and the first lens sheet group includes at least one first lens sheet 102. The second lens component 200 includes a second lens barrel 201 and a second lens sheet group mounted in the second lens barrel 201, the second lens sheet group includes at least one second lens sheet 202, and the first lens sheet group and the second lens sheet group together constitute an imageable optical system. The first glue material 300 is arranged between the second lens component 200 and the first lens component 100, and the first glue material 300 is suitable for supporting and fixing the first lens component 100 and the second lens component 200 after curing so that a relative position of the above two is maintained at a relative position determined by Active Alignment. The second lens barrel 201 has an outer top surface 2011 and an inner top surface 2012, and the second lens sheet group bears against the inner top surface 2012. The outer top surface 2011 includes a glue spreading surface 2011a suitable for arranging the first glue material 300 and an extension surface 2011b extending from the glue spreading surface 2011a to a central axis C2 of the second lens barrel 201. In this embodiment, the first glue material 300 is not arranged on the extension surface 2011b. There is a first thickness from the glue spreading surface 2011a to the inner top surface 2012, there is a second thickness from the extension surface 2011b to the inner top surface 2012, and the first thickness is greater than the second thickness. The Active Alignment is to adjust the relative position of the first lens component 100 and the second lens component 200 based on an imaging result of the optical system to determine a relative position (referring to the relative position of the first lens component 100 and the second lens component 200) that can make the imaging quality reach a standard. To facilitate understanding, hereinafter, the Active Alignment will be further described.

In the above-mentioned embodiment, by the design of making the first thickness greater than the second thickness, a top 209 of the second lens barrel 201, especially a part of the top 209 of the second lens barrel 201 corresponding to the glue spreading surface 2011a, can be thickened. Thus, to the structural strength of the top 209 of the second lens barrel is increased, which in turn suppresses the variations of the performance of the optical system due to deformation of a skyward surface (i.e. the outer top surface 2011 of the second lens barrel 201). In addition, the above-mentioned embodiment can also enhance the ability of a part of the top 209 of the second lens barrel 201 corresponding to the extension surface 2011b to resist deformation when it is pressed by the second lens sheet (for example, when the second lens sheet is embedded in the second lens barrel to assemble the second lens sheet group).

Figure 2:
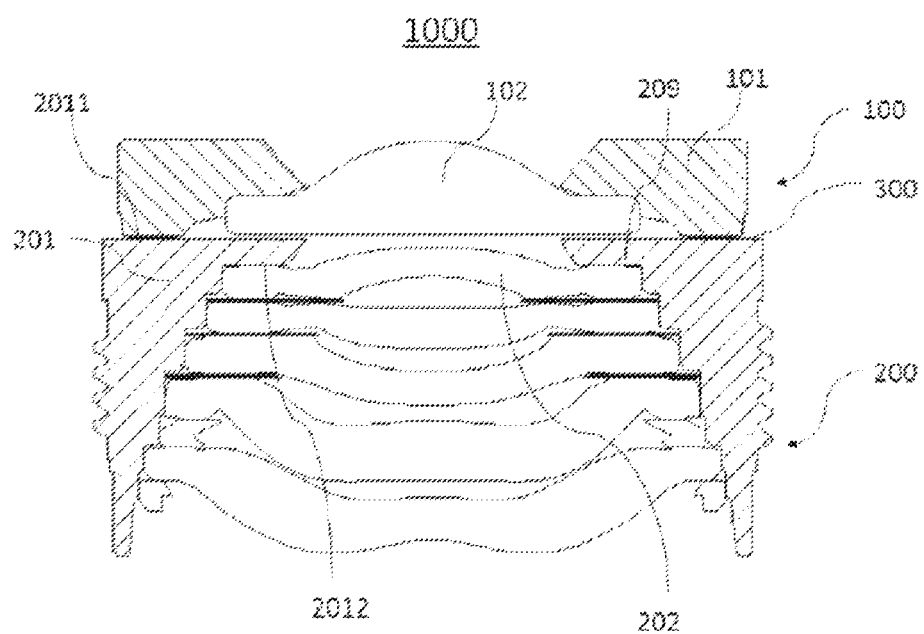
FIG. 2 shows an optical lens of a comparative example.

To facilitate understanding, a comparative example is introduced below for illustration. FIG. 2 shows an optical lens of a comparative example. Referring to FIG. 2, the optical lens of this comparative example includes a first lens component 100, a second lens component 200 and a first glue material 300. Unlike the embodiment in FIG. 1, in the comparative example, the outer top surface 2011 of the second lens barrel 201 is a flat surface, and the top 209 of the second lens barrel 201 is not thickened as shown in FIG. 1. When assembling, the second lens sheet 202 is mounted in the second lens barrel 201 to assemble the second lens sheet group. The thinner skyward surface may not be able to bear it and protrudes outwards, causing the skyward surface to deform. In this way, the upper surface of the second lens component 200 forms an arc surface. In the assembly process of a typical optical lens, it is necessary to perform multi-point height measurement on an upper surface of the second lens component 200 so as to pre-position the first lens component 100 and the second lens component 200. However, if the upper surface of the second lens component 200 is an arc surface, there will be deviations in the measured positions, resulting in the inability to obtain an accurate pre-positioning position (by design, plane processing is performed on the skyward surface of the lower group (i.e. the second lens sheet group), laser ranging measurement is performed on three points or more to fit a plane, and the fitted plane is used as the position of the skyward surface), which in turn affects the product yield. On the other hand, in a multi-group lens, a glue material is applied between the lens barrels of the upper and lower lens to components for bonding to make it a complete optical system. However, during production, the lens may be exposed or baked for a short period of time, and during use, it may be exposed to various temperature and humidity conditions for a long time. These situations may cause certain changes in the form of the glue material. At the same time, the thermal stress generated by the heating of the lens sheets and the lens barrels themselves will also cause certain deformation, resulting in the variations in the performance of the optical system. Variations during production affect product yield and increase costs, and variations during use affect product reliability and lifetime. In the comparative example, the thinner top 209 of the second lens barrel 201 is difficult to resist the above-mentioned variation factors during production or use, which may cause the skyward surface to continue to deform, cause the variations of the performance of the optical system, and affect the reliability and yield of the optical lens.

However, in the embodiment of FIG. 1, by thickening the top 209 of the second lens barrel 201, especially thickening the part of the top 209 of the second lens barrel 201 corresponding to the glue spreading surface 2011a, the structural strength of the skyward surface (i.e. the outer top surface 2011 of the second lens barrel 201) can be increased, thereby increasing the accuracy of pre-positioning, and making the optical lens better resistant to variations in the performance of the optical system caused by various factors during production or use. On the other hand, in the embodiment of FIG. 1, it is possible to avoid an increase in the total optical length (i.e. TTL) of the optical lens due to the overall thickening of the top 209 of the second lens barrel 201, thus contributing to the miniaturization of the optical lens and the camera module.

Figure 3:
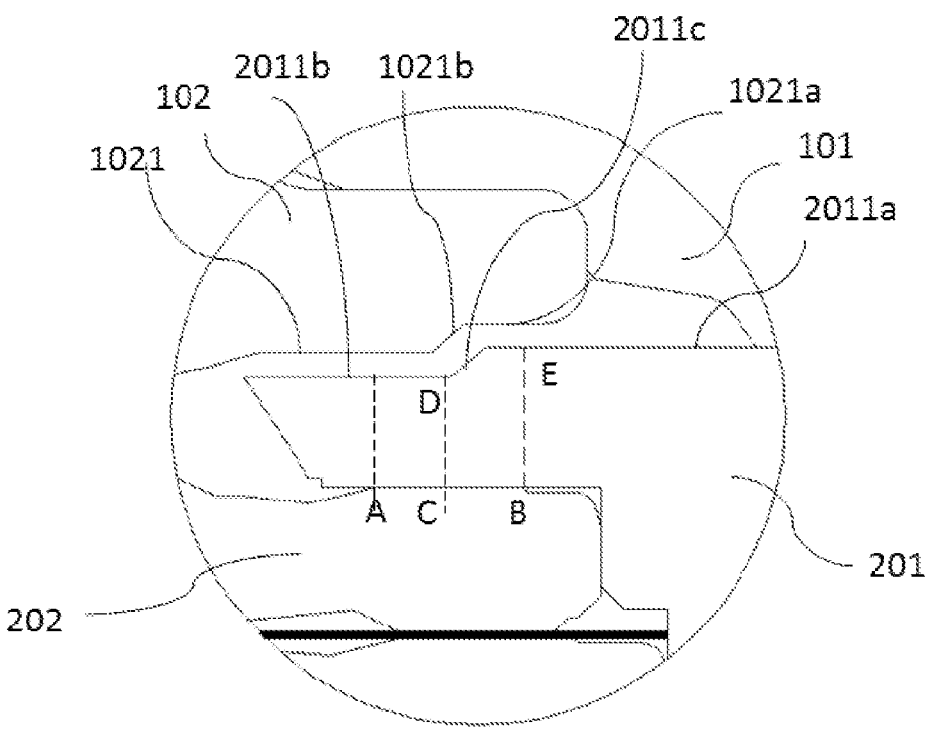
FIG. 3 shows a partial enlarged view of a region around a top of a second lens barrel in an embodiment of the present application.

Further, FIG. 3 shows a partial enlarged view of a region around a top of a second lens barrel in an embodiment of the present application. Referring to FIGS. 1 and 3 in combination, in an embodiment of the present application, there is a transition surface 2011c between the glue spreading surface 2011a and the extension surface 2011b. The transition surface 2011c is an inclined surface. The transition surface 2011c is designed as an inclined surface, which contributes to demolding of the second lens barrel in the molding process, thereby improving the yield. In this embodiment, an included angle between the transition surface and a central axis of the second lens barrel is 30° to 85°. The glue spreading surface 2011a is a flat surface. The inner top surface 2012 includes a bearing surface that bears against the second lens sheet group and a non-bearing surface that does not bear against the second lens sheet group, the bearing surface has a first end A close to the central axis and a second end B facing away from the central axis, and in a radial direction, one end D of the transition surface 2011c connected to the extension surface 2011b is located at a position between the first end A and the second end B, wherein the radial direction is a direction perpendicular to the central axis (i.e. a horizontal direction in FIG. 3). In other words, in this embodiment, the region of the top 209 of the second lens barrel 201 for bearing the second lens sheet group is thickened, thereby suppressing the deformation of the skyward surface. In this embodiment, the position of the transition surface 2011c is set at a position that does not interfere with light outgoing of the first lens sheet group.

Further, still referring to FIGS. 1 and 3 in combination, in an embodiment of the present application, there is a midpoint C between the first end A and the second end B. Moreover, in the radial direction, the one end D of the transition surface 2011c connected to the extension surface 2011b coincides with the midpoint C in a plan view, or is located a position closer to the central axis of the second lens barrel 201 than the midpoint C. In other words, there is a first radial distance (the radial distance is a distance in a horizontal direction in FIG. 1) from the one end D of the transition surface 2011c connected to the extension surface 2011b to a third end E on the outer top surface 2011 coinciding with the second end B of the inner top surface 2012 (referring to coincidence in a top view direction), and there is a second radial distance from the first end A to the second end B. The first radial distance is at least greater than half of the second radial distance. In this embodiment, the bearing strength of the top 209 of the second lens barrel 201 against the first lens sheet of the lower group can be further enhanced to prevent the skyward surface of the second lens barrel 201 from protruding upwards when the second lens to sheet 202 is assembled.

Further, still referring to FIGS. 1 and 3 in combination, in an embodiment, in an axial direction, a distance from the glue spreading surface 2011a to the extension surface 2011b is at least 50 microns, and the axial direction is a direction parallel to the central axis of the second lens barrel 202. In other words, the glue spreading surface 2011a is at least 50 microns higher than the extension surface 2011b.

Further, referring to FIG. 1, in an embodiment of the present application, the first lens component 100 further includes a first lens barrel 101, and the first lens sheet group is mounted in the first lens barrel 101. It needs to be noted that in other embodiments of the present application, the first lens barrel can be eliminated. For example, in an embodiment, the first lens sheet group may be assembled by embedding or bonding a plurality of first lens sheets 102 to each other. In another embodiment, a single first lens sheet 102 may be used to form the first lens sheet group.

Further, in an embodiment, an inner side surface of the second lens barrel 201 has multiple steps, and the at least one second lens sheet 202 is sequentially embedded in the multiple steps to assemble the second lens sheet group.

Further, referring to FIGS. 1 and 3, in an embodiment of the present application, the first lens sheet group includes an optical zone and a structural zone surrounding the optical zone, and a bottom surface 1021 of the structural zone has a retracted surface 1021a to avoid the glue spreading surface 2011a. The retracted surface 1021a includes an inclined surface 1021b corresponding to the transition surface 2011c. In this embodiment, since the bottom surface of the structural zone of the first lens sheet group has a retracted surface 1021a avoiding the glue spreading surface 2011a, the increase in the total optical length (TTL) caused by the thickening of the top 209 of the second lens barrel 201 can be avoided, contributing to the miniaturization of optical lens or camera module. Furthermore, the thickness of the first lens barrel 101 can be reduced (the thickness here refers to the dimension along the optical axis O1 of the first lens component or the central axis C1 direction of the first lens barrel) to avoid the thickened top 209 of the second lens barrel 201, so that the first lens barrel and the second lens barrel have a sufficient design gap in the thickness direction for Active Alignment. The reduced thickness of the first lens barrel 101 may be equal to the increased thickness of the top 209 of the second lens barrel 201. With reference to the previous description in the first embodiment, it can be seen that the top 209 has the first thickness and the second thickness, and a difference between the first thickness and the second thickness can be regarded as the increased thickness of the top 209 of the second lens barrel 201.

Further, referring to FIG. 1, in an embodiment of the present application, a distance between the extension surface 2011b and the bottom surface of the first lens sheet group is 30 to 150 microns.

Further, referring to FIG. 1, in an embodiment of the present application, a distance between the transition surface 2011c of the second lens barrel 201 and the inclined surface of the first lens sheet group is at least twice a distance between the extension surface 2011b and the bottom surfaces of the first lens sheet group, to satisfy a movable gap for adjusting the relative position of the first lens component 100 and the second lens component 200 during the Active Alignment.

Further, referring to FIGS. 1 and 3, in an embodiment of the present application, there is a first design distance and a second design distance between the first lens component 100 and the second lens component 200, to satisfy the movable gap for adjusting the relative position of the first lens component 100 and the second lens component 200 during the Active Alignment. The first design distance is at least twice the second design distance. The first design distance is a design distance between the transition surface 2011c of the second lens barrel 201 and the inclined surface 1021b of to the first lens sheet group that is determined by an optical design of the optical system. The second design distance is a design distance between the extension surface 2011b and the bottom surface of the first lens sheet group that is determined by the optical design of the optical system. In the finished optical lens, the relative position between the first lens component 100 and the second lens component 200 is determined by the result of Active Alignment. Thus, the above-mentioned design distances may be different from the actual distances of the actual product. However, it is easily understood by those skilled in the art that for the same batch of products under the same optical design, the actual distances will show a statistical law related to the design distances, thereby determining whether the actual optical lens product has the feature that the first design distance is at least twice the second design distance.

Further, in an embodiment, since the relative position of the first lens component 100 and the second lens component 200 is determined by Active Alignment, there can be a non-zero included angle between the optical axis of the first lens component 100 and the optical axis of the second lens component 200.

Further, according to an embodiment of the present application, there is further provided a camera module, which includes a photosensitive assembly and an optical lens. The optical lens may be the optical lens in any one of the foregoing embodiments. The optical lens can be mounted in an optical actuator (such as a motor). For example, the optical lens may be mounted on an inner side surface of a motor carrier to form an optical lens assembly with a motor, and the optical lens assembly may be mounted on the top of the photosensitive assembly.

According to an embodiment of the present application, there is further provided an optical lens assembling method including the following steps:

Step S100: pre-position a first lens component 100 and a second lens to component 200. The first lens component 100 includes a first lens sheet group and the first lens sheet group includes at least one first lens sheet 102. The second lens component 200 includes a second lens barrel 201 and a second lens sheet group mounted in the second lens barrel 201, and the second lens sheet group includes at least one second lens sheet 202. The second lens barrel 201 has an outer top surface 2011 and an inner top surface 2012. The second lens sheet group bears against the inner top surface 2012. The outer top surface 2011 includes a glue spreading surface 2011a and an extension surface 2011b formed by extending from the glue spreading surface 2011a to a central axis of the second lens barrel 201. There is a first thickness from the glue spreading surface 2011a to the inner top surface 2012, there is a second thickness from the extension surface 2011b to the inner top surface 2012, and the first thickness is greater than the second thickness. The pre-positioning enables the first lens sheet group and the second lens sheet group to constitute an imageable optical system together.

Step S200: actively align a relative position of the first lens component 100 and the second lens component 200 based on an imaging result of the optical system.

Step S300: bond the first lens component 100 and the second lens component 200, so that the relative position of the above two is maintained at a relative position determined by the Active Alignment.

In an embodiment, an inner side surface of the second lens barrel 201 has multiple steps, and the optical lens assembling method further includes: inverting the second lens barrel 201, and then sequentially embedding the at least one second lens sheet 202 into the multiple steps to assemble the second lens sheet group.

In an embodiment, the pre-positioning step (i.e. S100) further includes: obtaining positions of the first lens component 100 and the second lens component 200 by laser ranging, and then performing the pre-positioning, to wherein the position of the second lens component 200 is obtained by performing laser ranging on the outer top surface 2011.

In an embodiment, the bonding step (i.e. S300) includes: arranging a first glue material 300 on the glue spreading surface 2011a; and curing the first glue material 300 so that the relative position of the first lens component 100 and the second lens component 200 is maintained at the relative position determined by the Active Alignment. The step of curing the first glue material 300 includes: pre-curing the first glue material 300 by exposure; and permanently curing the first glue material 300 by baking. The step of arranging the first glue material 300 is performed before the Active Alignment step, or after the Active Alignment step is completed (for example, after the Active Alignment is completed, a three-dimensional coordinate position of the first lens component 100 is recorded, then the first lens component 100 is moved away, glue is applied to the outer top surface 2011 of the second lens barrel 201, and then the first lens component 100 is moved back according to the recorded three-dimensional coordinate position).

The Active Alignment process used in the optical lens or camera module assembling method will be further introduced below.

Figure 4A:
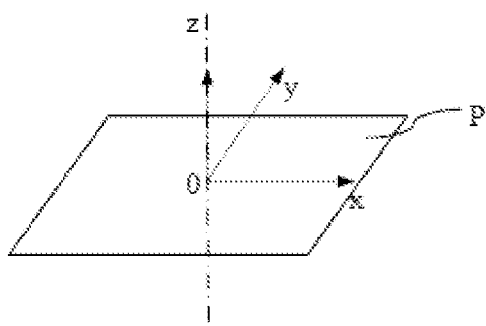
FIG. 4A shows a relative position adjustment manner in Active Alignment in an embodiment of the present application.

The Active Alignment described in the present application can adjust the relative position of the first lens component 100 and the second lens component 200 in multiple degrees of freedom. FIG. 4A shows a relative position adjustment manner in the Active Alignment in an embodiment of the present application. In this adjustment manner, the first lens component 100 (or may be the first lens sheet 101) can be moved along x, y, and z directions relative to the second lens component 200 (that is, the relative position adjustment in this embodiment has three degrees of freedom). The z direction is a direction along the optical axis, and the x and y directions are directions perpendicular to the optical axis. The x and y directions are both in an adjustment plane P, and the translation in the adjustment plane P can be decomposed into two components in the x and y directions.

Figure 4B:
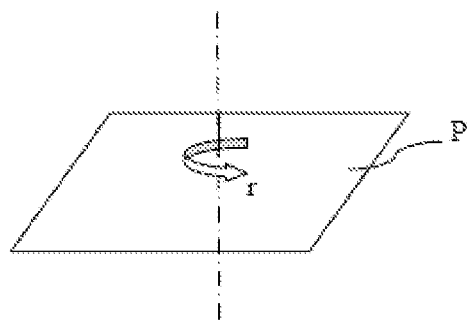
FIG. 4B shows rotation adjustment in Active Alignment according to another embodiment of the present application.

FIG. 4B shows rotation adjustment in the Active Alignment according to another embodiment of the present application. In this embodiment, in addition to the three degrees of freedom in FIG. 4A, a degree of freedom in rotation is, i.e., an adjustment in an r direction, is also added to the relative position adjustment. In this embodiment, the adjustment in the r direction is rotation in the adjustment plane P, i.e. rotation around an axis perpendicular to the adjustment plane P.

Figure 4C:
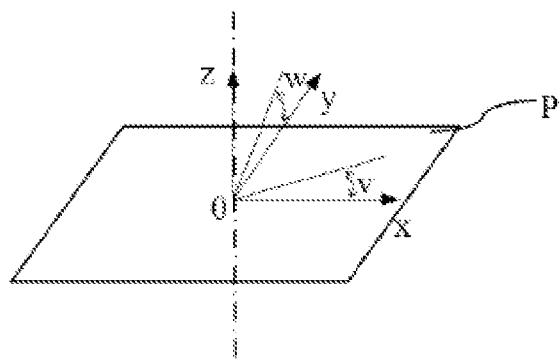
FIG. 4C shows a relative position adjustment manner in which adjustments in v and w directions are added in Active Alignment according to further another embodiment of the present application.

Further, FIG. 4C shows a relative position adjustment manner in which adjustments in v and w directions are added in the Active Alignment according to further another embodiment of the present application. The v direction represents a rotation angle of an xoz plane, and the w direction represents a rotation angle of a yoz plane. The rotation angles of the v direction and the w direction can be combined into a vector angle, which represents a total tilt state. That is to say, by adjusting in the v and w directions, the tilt attitude of the first lens component relative to the second lens component (i.e. tilt of an optical axis O1 of the first lens component relative to an optical axis O2 of the second lens component) can be adjusted.

The adjustments in the six degrees of freedom of x, y, z, r, v, and w may all affect the imaging quality of the optical system (for example, affecting the size of the resolution). In other embodiments of the present application, the relative position adjustment manner may be to adjust only in any one of the above-mentioned six degrees of freedom, or may be a combination of any two or more of them.

Further, in an embodiment, in the Active Alignment step, the adjustment of the relative position of the first lens component and the second lens component includes translation on the adjustment plane, namely, movement in x and y directions.

Further, in an embodiment, in the Active Alignment step, the adjustment of the relative position of the first lens component 100 and the second lens component further includes: adjusting and determining an included angle between an axis of the first lens component and an axis of the second lens component according to the measured resolution of the optical system, namely, adjustment in w and v directions. In the assembled optical lens or camera module, there may be a non-zero included angle between the axis of the first lens component and the axis of the second lens component.

Further, in an embodiment, in the Active Alignment step, the adjustment of the relative position of the first lens component and the second lens component further includes: moving the first lens component in a direction perpendicular to the adjustment plane (i.e. adjustment in a z direction), and determining the relative position between the first lens component and the second lens component in a direction perpendicular to the adjustment plane according to the measured resolution of the optical system.

Further, in an embodiment, the first lens component may not have a first lens barrel. For example, the first lens component may be composed of a single first lens sheet. Before Active Alignment, pre-positioning is first performed so that there is a gap between the bottom surface of the first lens sheet and the top surface of the second lens component. Thereafter, Active Alignment is performed, and then the glue material is arranged in the gap and the glue material is cured. In this embodiment, the first lens sheet may be formed by a plurality of sub-lens sheets that are embedded or bonded to each other to form one body. In this embodiment, a side surface and a top surface of non-optical surfaces of the first lens sheet that are not used for imaging may form a light shielding layer. The light-shielding layer may be formed by screen printing a light-shielding material on the side surface and the top surface of the first lens sheet.

In an embodiment, in the Active Alignment step, the second lens component can be fixed, the first lens component can be clamped by a clamper, and the first lens component can be moved under the drive of a six-axis motion mechanism connected to the clamper, thereby realizing the above-mentioned relative movement of six degrees of freedom between the first lens component and the second lens component. The clamper can bear against or partially bear against the side surface of the first lens component, thereby clamping the first lens component and performing position adjustment with multiple degrees of freedom.

The above description is only the preferred implementations of the present application and the explanation of the applied technical principle. It should be understood by those skilled in the art that the scope of disclosure involved in the present application is not limited to the technical solutions formed by specific combinations of the above technical features, and at the same time, should also cover other technical solutions formed by any combination of the above technical features or equivalent features thereof without departing from the concept of the disclosure. For example, the above features and (but not limited to) the technical features with similar functions disclosed in the present application are replaced with each other to form technical solutions.

What is claimed is:

1. An optical lens, comprising:
a first lens component comprising a first lens sheet group, the first lens sheet group comprising at least one first lens sheet;
a second lens component comprising a second lens barrel and a second lens sheet group mounted in the second lens barrel, the second lens sheet group comprising at least one second lens sheet, wherein the first lens sheet group and the second lens sheet group together constituting an imageable optical system, wherein the second lens barrel has an outer top surface and an inner top surface, and the second lens sheet group bears against the inner top surface; and
a first glue material arranged between the outer top surface and a bottom surface of the first lens component, the first glue material being suitable for supporting and fixing the first lens component and the second lens component after curing, so that a relative position of the first lens component and the second lens component is maintained at a relative position,
wherein the outer top surface comprises a glue spreading surface suitable for arranging the first glue material and an extension surface formed by extending from the glue spreading surface toward a central axis of the second lens barrel, wherein a direction of the central axis of the second lens barrel is parallel to a direction of an optical axis of the second lens component, wherein there is a first thickness from the glue spreading surface to the inner top surface in the direction of the optical axis of the second lens component, there is a second thickness from the extension surface to the inner top surface in the direction of the optical axis of the second lens component, and the first thickness is greater than the second thickness, wherein a distance between the extension surface and a bottom surface of the first lens sheet group is 30 to 150 microns.

2. The optical lens according to claim 1, wherein the first glue material is not arranged on the extension surface.

3. The optical lens according to claim 1, wherein there is a transition surface between the glue spreading surface and the extension surface.

4. The optical lens according to claim 3, wherein the transition surface is an inclined surface, and an included angle between the transition surface and the central axis of the second lens barrel is 30° to 85°.

5. The optical lens according to claim 3, wherein the inner top surface comprises a bearing surface that bears against the second lens sheet group and a non-bearing surface that does not bear against the second lens sheet group, wherein the bearing surface has a first end close to the central axis of the second lens barrel and a second end facing away from the central axis of the second lens barrel, and in a radial direction, one end of the transition surface connected to the extension surface is located at a position between the first end and the second end, wherein the radial direction is a direction perpendicular to the central axis of the second lens barrel.

6. The optical lens according to claim 5, wherein there is a midpoint between the first end and the second end; and in the radial direction, the one end of the transition surface connected to the extension surface is located at the midpoint or at a position closer to the central axis of the second lens barrel than the midpoint.

7. The optical lens according to claim 3, wherein the first lens component further comprises a first lens barrel, and the first lens sheet group is mounted in the first lens barrel.

8. The optical lens according to claim 7, wherein the first lens sheet group comprises an optical zone and a structural zone surrounding the optical zone, and a bottom surface of the structural zone has a retracted surface that avoids the glue spreading surface.

9. The optical lens according to claim 8, wherein the retracted surface comprises an inclined surface corresponding to the transition surface.

10. The optical lens according to claim 9, wherein a distance between the transition surface of the second lens barrel and the inclined surface of the first lens sheet group is at least twice a distance between the extension surface and the bottom surface of the first lens sheet group.

11. The optical lens according to claim 9, wherein there is a first design distance and a second design distance between the first lens component and the second lens component; the first design distance is at least twice the second design distance;
the first design distance is a design distance between the transition surface of the second lens barrel and the inclined surface of the first lens sheet group that is determined by an optical design of the optical system; and the second design distance is a design distance between the extension surface and the bottom surface of the first lens sheet group that is determined by the optical design of the optical system.

12. The optical lens according to claim 1, wherein in an axial direction, a distance from the glue spreading surface to the extension surface is at least 50 microns, and the axial direction is a direction parallel to the central axis of the second lens barrel.

13. The optical lens according to claim 1, wherein there is a non-zero included angle between an optical axis of the first lens component and the optical axis of the second lens component.

14. A camera module, comprising an optical lens, the optical lens comprising:
a first lens component comprising a first lens sheet group, the first lens sheet group comprising at least one first lens sheet;
a second lens component comprising a second lens barrel and a second lens sheet group mounted in the second lens barrel, the second lens sheet group comprising at least one second lens sheet, wherein the first lens sheet group and the second lens sheet group together constituting an imageable optical system, wherein the second lens barrel has an outer top surface and an inner top surface, and the second lens sheet group bears against the inner top surface; and
a first glue material arranged between the outer top surface and a bottom surface of the first lens component, the first glue material being suitable for supporting and fixing the first lens component and the second lens component after curing, so that a relative position of the first lens component and the second lens component is maintained at a relative position, wherein the outer top surface comprises a glue spreading surface suitable for arranging the first glue material and an extension surface formed by extending from the glue spreading surface toward a central axis of the second lens barrel, wherein a direction of the central axis of the second lens barrel is parallel to a direction of an optical axis of the second lens component, wherein there is a first thickness from the glue spreading surface to the inner top surface in the direction of the optical axis of the second lens component, there is a second thickness from the extension surface to the inner top surface in the direction of the optical axis of the second lens component, and the first thickness is greater than the second thickness, wherein a distance between the extension surface and a bottom surface of the first lens sheet group is 30 to 150 microns.

15. An optical lens assembling method, comprising:

pre-positioning a first lens component and a second lens component so that a first lens sheet group comprised in the first lens component and a second lens sheet group comprised in the second lens component together constitute an imageable optical system, wherein the first lens sheet group comprises at least one first lens sheet, the second lens component further comprises a second lens barrel, the second lens sheet group is mounted in the second lens barrel, the second lens sheet group comprises at least one second lens sheet, the second lens barrel has an outer top surface and an inner top surface, the second lens sheet group bears against the inner top surface, the outer top surface comprises a glue spreading surface and an extension surface formed by extending from the glue spreading surface toward a central axis of the second lens barrel, wherein a direction of the central axis of the second lens barrel is parallel to a direction of an optical axis of the second lens component, wherein there is a first thickness from the glue spreading surface to the inner top surface in the direction of the optical axis of the second lens component, there is a second thickness from the extension surface to the inner top surface in the direction of the optical axis of the second lens component, and the first thickness is greater than the second thickness, wherein a distance between the extension surface and a bottom surface of the first lens sheet group is 30 to 150 microns;

actively calibrating a relative position of the first lens component and the second lens component based on an imaging result of the optical system; and bonding the first lens component and the second lens component, so that the relative position of the first lens component and the second lens component is maintained at a relative position determined by Active Alignment.

16. The optical lens assembling method according to claim 15, wherein an inner side surface of the second lens barrel has multiple steps, and the optical lens assembling method further comprises: inverting the second lens barrel, and then sequentially embedding the at least one second lens sheet into the multiple steps to assemble the second lens sheet group.

17. The optical lens assembling method according to claim 16, wherein the pre-positioning further comprises: obtaining positions of the first lens component and the second lens component by laser ranging, and then performing the pre-positioning, wherein the position of the second lens component is obtained by performing laser ranging on the outer top surface.

18. The optical lens assembling method according to claim 17, wherein the bonding comprises:

arranging a first glue material on the glue spreading surface; and curing the first glue material so that the relative position of the first lens component and the second lens component is maintained at the relative position determined by the Active Alignment.

19. The optical lens assembling method according to claim 18, wherein the curing the first glue material comprises:

pre-curing the first glue material by exposure; and
permanently curing the first glue material by baking.

* * * * *